April 24, 1956    C. M. DE WOODY ET AL    2,742,709

PLASTIC DESICCATOR

Filed March 8, 1955

INVENTORS
**CHARLES M. DEWOODY
JOHN J. MAGERA**

BY

ATTORNEY

United States Patent Office 2,742,709
Patented Apr. 24, 1956

2,742,709

PLASTIC DESICCATOR

Charles M. De Woody, Vineland, N. J., and John J. Magera, Louisville, Ky., assignors to Ace Glass Incorporated, Vineland, N. J., a corporation of New Jersey Application March 8, 1955, Serial No. 493,002

3 Claims. (Cl. 34—92)

This invention relates to desiccators of the type used in laboratories for dehydrating various materials under vacuum conditions, wherein a desiccant is contained in the bottom portion of a receptacle beneath a perforated plate for supporting the materials to be treated, and the entire receptacle is subjected to a vacuum. More particularly, the invention consists in new and useful improvements in a desiccator of this type, wherein the receptacle and its closure are composed of a suitable plastic material and the receptacle is substantially hemispherical in shape, with an annular supporting ring or base also of plastic material.

Heretofore, desiccators have generally been made of glass or metals such as aluminum and copper which are easily fabricated by "spinning." Experience has shown that when glass desiccators are used under reduced internal pressure, they implode unpredictably for the reason that the glass surface is often scratched in processing and the defect has gone unnoticed. Metal desiccators have the disadvantage of being non-transparent and are frequently inclined to warp when dented, so that the maintenance of a vacuum is made difficult.

It is therefore an object of the present invention to overcome these disadvantages and to provide a desiccator which is formed of suitable plastics, comprising either organic or partially organic polymers, fabricated with substantially hemispherical walls which afford a maximum of self-support under vacuum conditions.

Another object of the invention is to provide a hemispherical desiccator of plastic material, and provided with an annular supporting ring or base also formed of suitable plastic and cemented to the desiccator to form an integral structure. Properly selected plastics are more adaptable to this particular hemispherical body and integral ring because of the flexibility of the material, thus obviating the objectionable features of glass which has a tendency to break under stresses resulting from changes in temperature.

A further object of the invention is to provide a desiccator of this type, having high impact strength and non-shattering characteristics which are particularly important for vacuum operation.

A still further object of the invention is to provide a hemispherical desiccator of plastic material, including means to compensate for physical movement of the walls of the desiccator when a vacuum is created therein, to avoid a temporary parting of the outer edges of the closure flange seal.

Still another object of the invention is to provide in a desiccator of this type, an improved valve structure whereby, upon the release of the vacuum, the influx of atmospheric air is diverted from the material being treated in the desiccator.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views, Figure 1 is a view in side elevation, partially broken away, showing the preferred form of the present invention.

Figure 1:
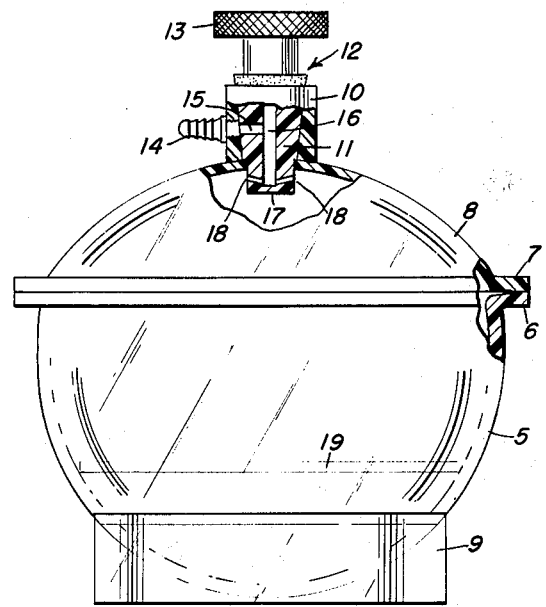

In Fig. 1 of the drawings which illustrates the preferred form of the invention, the desiccator comprises a main body portion 5 having a top flange 6 adapted to embrace a complementary flange 7 on the top or closure 8. The combined unit including the body 5 and closure 8 is substantially in the form of a sphere, and rests upon an annular ringe or base 9, which is cemented to the body.

The material used in the construction of all three of these elements may be any of a number of plastics, although transparent or translucent plastics are preferred. Suitable types are Plexiglas (an acrylic polymer), polystyrene and polystrene co-polymers, clear phenolics and certain chloro-fluoro ethylene polymers.

The central portion of the closure 8 is extended upwardly to form a neck 10 and receives the plug 11 of a control valve 12. The plug 11 is substantially frusto-conical in shape and provided with a knurled handle 13 in the usual manner. A brass hose connection 14 is secured in a suitable opening in the side wall of the neck 10 and registers with a transverse port 15 in the plug 11, said transverse port in turn being in communication with a longitudinal passageway 16 extending partially through the plug 11. However, as will be seen from Fig. 1, the lower end of the horizontal passageway 16 is closed by a bottom 17 and access to the passageway from the interior of the desiccator body and vice versa, is provided solely through a series of radial ports 18 which are directed upwardly at a reverse angle from the lower portion of the passageway 16. Thus, the force of external air entering the desiccator through the valve passageway 16, upon the release of a vacuum in the desiccator, is diverted upwardly against the adjacent hemispherical inner walls of the closure 8 and away from the material in the desiccator.

A perforated plate 19 preferably composed of ceramic material extends across the desiccator body 5 for supporting the material to be treated. This plate is circular in form and of sufficient diameter to engage the inner walls of the body 5 in a predetermined horizontal plane intermediate the vertical extremities thereof. It is to be noted that due to the converging walls of the desiccator body 5, material supporting plates of varying diameter may be employed without the necessity of pre-arranged supporting means on the inner face of the body. Of course, small inwardly projecting ridges or lugs may be molded in to the wall or body 5 to act as floor plate supports, but this is not generally necessary since the plate does not move under ordinary conditions.

In the use of this form of the invention, the desiccator body 5 rests upon a suitable flat support, with the ring 9 acting as a base to prevent tilting or upsetting. A suitable desiccant is deposited in the bottom of the body 5 beneath the material supporting plate 19 and the valve connection 14 on the neck 10 is connected by a hose to a source of vacuum. By manipulation of the valve 12 the degree of vacuum in the desiccator may be controlled and released in the usual manner.

With some plastics of ⅜" thickness or less, notably

Plexiglas, there is a tendency of the walls of the desiccator to undergo physical movement when a vacuum is created therein. This movement is sufficient to cause a temporary parting of the outer edges of the seal between the flanges 6 and 7 of the desiccator body 5 and closure 8 respectively. Although this parting of the edges of the seal may not be sufficient in all cases to cause leakage, the movement significantly diminishes the area of sealing and we have found that a practical solution to this problem is to relieve the inner area of one or both of the flanges 6 and 7.

Figure 4:
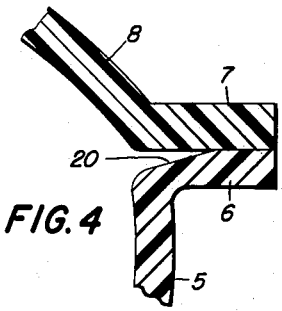
Figure 4 is an enlarged fragmentary sectional view of the sealing flange arrangement.

As will be seen in Figure 4, the upper or sealing surface of flange 6 is inwardly and downwardly inclined as at 20. An angle of 1 to 6 degrees from the horizontal is preferred, starting at a point near the radial center of the flange surface and continuing to the inner edge of the flange. This provides ample area for sealing at both atmospheric and reduced pressures, as the desiccator is normally used. At an absolute pressure of approximately 300 mm. Hg the transition from one surface to the other occurs and a "line seal" about 1 mm. wide is maintained as a minimum after which it again increases.

Of course, the angle required depends on the rigidity of the plastics and might approach zero, but would be impractical if it went much beyond 10 degrees, due to the fact that the "line seal" would be too narrow in the transition zone with the more rigid plastics. If substantially more than 10 degrees should be required, the plastic material would be considered too flexible for satisfactory service.

There are many advantages in using this type of plastic desiccator with the hemispherical body 5 resting in the base ring 9 and secured thereto to form an integral structure, as the ring definitely adds strength. A series of tests conducted with thin walled bodies without the ring secured thereto, showed that some of the bodies were caused to collapse under vacuum. With the addition of the ring 9, and under similar operating conditions, in some cases the ring arrested complete collapse and in others where implosion occurred, fragmentation was definitely inhibited.

While the required thickness of the body depends on the plastic material used, generally speaking a thickness of ⅜″ is sufficient, while a thickness of less than ¹⁄₁₆″ is of doubtful utility. It is to be noted that a weight advantage of ⅕ the weight of glass is possible by the use of plastic materials in desiccators of this type.

Figure 3:
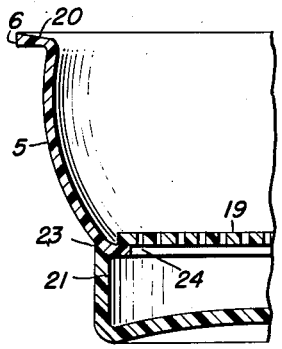
Figure 3 is a fragmentary sectional view of a further modification of the invention.
Figure 2:
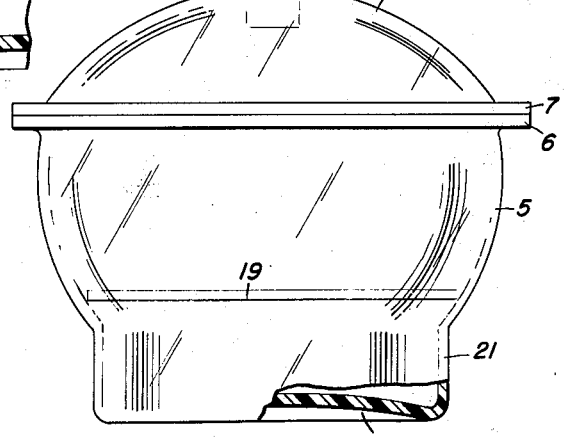
Figure 2 is a similar view of a modified form of desiccator wherein the bottom of the hemispherical body is "blown out" to form a cup-shaped base or support.

In the modified form of desiccator illustrated in Figure 2, the bottom of the body 5 is "blown out" to form an integral cup-shaped support 21 which provides more interior capacity for the desiccant which in some instances is more desirable. While I have shown the bottom 22 of the cup 21 as concave from the under side, it will be understood that this bottom may be flat if desired.

Where the technique known as "vacuum forming" is used, the bottom wall is thinned down to such a degree, that heavier than normal stock is required to form the body from one piece. In order to obviate this, the cup-shaped portion 21 may be formed separately and joined to the body in a plane of appropriate diameter, as shown in Figure 3. This cup 21 may also be made of heavier material than the remainder of the body to act as a strengthening member and its upper annular edge sealed to the body as at 23 to form an integral structure.

In the form of the invention shown in Fig. 3, the bottom of the body 5 is open and its edge is turned inwardly to provide an annular flange 24 in the vicinity of the joint 23, which acts as a support for the perforated floor plate 19. This structure has an advantage over the others in that the floor plate 19 is more firmly supported and cannot tilt.

As previously stated, high impact strength and non-shattering characteristics are particularly important for vacuum operation. In this connection, it may be noted that so-called "filled" plastics, such as those having embedded glass fibers, may be used advantageously to increase the strength of the desiccator walls without increasing the thickness of the plastic used.

It will thus be seen that we have provided a desiccator which due to its particular shape and the materials used, eliminates the many disadvantages heretofore prevalent in desiccators of known construction.

From the foregoing it is believed that the invention may be readily understood by those skilled in the art without further description, it being borne in mind that numerous changes may be made in the details of construction without departing from the spirit of the invention as set forth in the following claims.

We claim:

1. A desiccator comprising a substantially hemispherical body formed of plastic material, a floor plate spaced upwardly from the bottom of said body, a convex closure of plastic material, complementary ceiling flanges on said closure and body respectively, a supporting base for said body, means for connecting said closure to a source of vacuum, and a valve in said closure for controlling the vacuum in the desiccator, said valve comprising a valve body which projects to the interior of said closure, a radial port in said valve body connectable with said source of vacuum, a longitudinal passageway communicating with said radial port and terminating in a closed end within said closure, and a second radial port leading from said closed end to the interior of said closure, said second radial port being upwardly inclined at a reverse angle, from the closed end of said passageway toward the surrounding interior surface of said closure.

2. A desiccator comprising a substantially hemispherical body formed of plastic material, a closure for said body, complementary radial sealing flanges on said closure and body respectively, having opposed annular sealing surfaces, an annular supporting base rigidly connected to the under side of said body, and means for placing said desiccator under vacuum, the sealing surface of at least one of said complementary flanges being annularly relieved with respect to the opposed surface of the adjacent flange, from a point intermediate the radial boundaries of said flange, to the inner limit thereof, to compensate for physical movement of the walls of said desiccator body and closure under vacuum.

3. In a plastic desiccator having a substantially hemispherical body a dome-shaped closure and means for placing said desiccator under vacuum; complementary radial sealing flanges on said body and closure respectively, the sealing surface of at least one of said flanges diverging with respect to the opposed surface of the adjacent flange, over an annular area extending from the inner boundary of said diverging flange, to a point intermediate the radial limits thereof, to compensate for physical movement of the walls of said body and closure, under vacuum.

References Cited in the file of this patent

UNITED STATES PATENTS

| 273,721 | Gerdom | Mar. 13, 1883 |
| 1,368,877 | Andrews | Feb. 15, 1921 |
| 2,329,078 | O'Daniel | Sept. 7, 1943 |
| 2,643,021 | Freedman | June 23, 1953 |
| 2,672,254 | Boardman | Mar. 16, 1954 |

FOREIGN PATENTS

| 188,052 | Germany | Sept. 10, 1907 |
| 474,148 | Great Britain | Oct. 26, 1937 |